United States Patent
Isshiki et al.

(10) Patent No.: US 8,305,851 B2
(45) Date of Patent: *Nov. 6, 2012

(54) OPTICAL DISK APPARATUS

(75) Inventors: Fumio Isshiki, Yokohama (JP); Hideki Maruyama, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/956,167

(22) Filed: Nov. 30, 2010

(65) Prior Publication Data

US 2011/0228654 A1   Sep. 22, 2011

(30) Foreign Application Priority Data

Mar. 17, 2010   (JP) ................................ 2010-060119

(51) Int. Cl.
*G11B 7/00*         (2006.01)
*G11B 20/10*        (2006.01)
*G11B 20/18*        (2006.01)
*G11B 5/55*         (2006.01)
*G11B 27/36*        (2006.01)

(52) U.S. Cl. ............... 369/44.11; 369/44.14; 369/44.25; 369/44.28; 369/47.45; 369/53.23; 369/53.28; 369/53.35

(58) Field of Classification Search ............... 369/44.11, 369/44.28, 53.23, 53.28, 44.14, 44.25, 47.45, 369/53.35

See application file for complete search history.

(56) References Cited

U.S. PATENT DOCUMENTS

| 2005/0078575 A1* | 4/2005 | Shibuya et al. ............ 369/44.37 |
| 2006/0104183 A1* | 5/2006 | Kataoka et al. .......... 369/112.01 |
| 2007/0109930 A1* | 5/2007 | Okamoto et al. .......... 369/44.37 |
| 2009/0129217 A1* | 5/2009 | Isshiki et al. ............... 369/44.23 |
| 2011/0063957 A1* | 3/2011 | Isshiki et al. ............... 369/44.11 |

FOREIGN PATENT DOCUMENTS

JP    2006-294189    10/2006

OTHER PUBLICATIONS

U.S. Appl. No. 12/776,480, filed May 10, 2010, Isshiki et al.

* cited by examiner

*Primary Examiner* — Joseph Feild
*Assistant Examiner* — Aneeta Yodichkas
(74) *Attorney, Agent, or Firm* — Antonelli, Terry, Stout & Kraus, LLP.

(57) ABSTRACT

An optical disk apparatus includes an optical pickup and a signal processor. The optical pickup includes an actuator for driving an objective lens, and a detected light intensity signal output part for outputting a detected light intensity signal to the processor. The signal processor includes a servo signal generator for generating a main push-pull signal and a sub push-pull signal on the basis of the detected light intensity signal supplied from the detected light intensity signal output part, a signal generator for generating a differential push-pull signal and a lens error signal by conducting addition/subtraction on the main push-pull signal and the sub push-pull signal, and a tracking offset correction signal generator which is input with the lens error signal to output a tracking offset correction signal. The differential push-pull signal correction is conducted by conducting addition/subtraction between the differential push-pull signal and the tracking offset correction signal.

11 Claims, 11 Drawing Sheets

FIG.2A
(Prior Art)
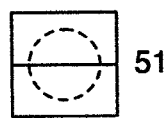
51
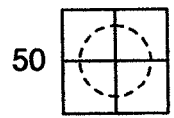
50
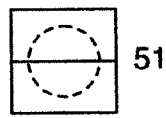
51
FIG.2B (Prior Art)
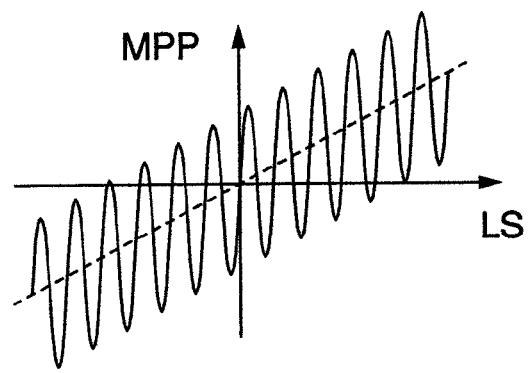
MPP
LS
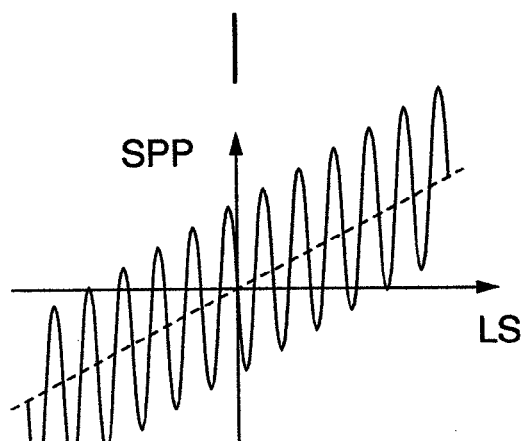
SPP
LS
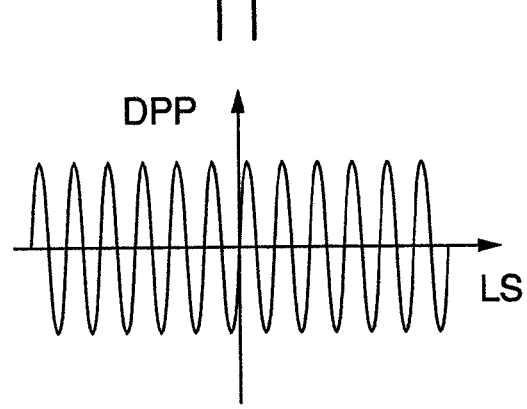
DPP
LS FIG.4A
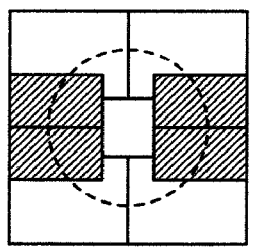
FIG.4B
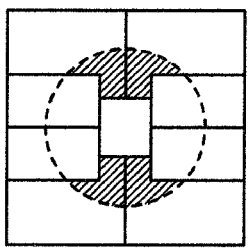
FIG.4C
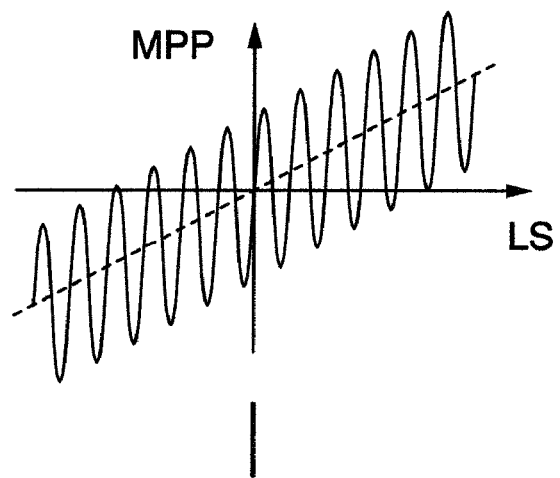
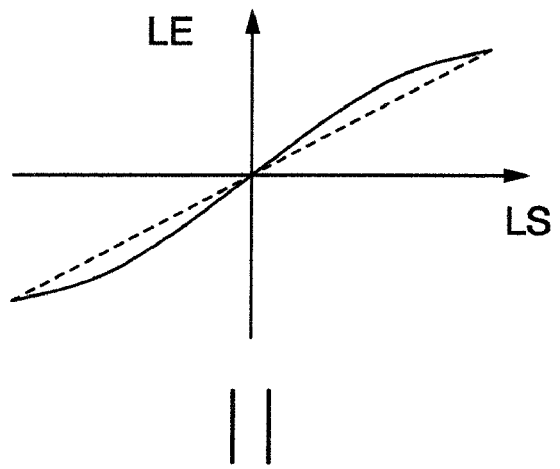
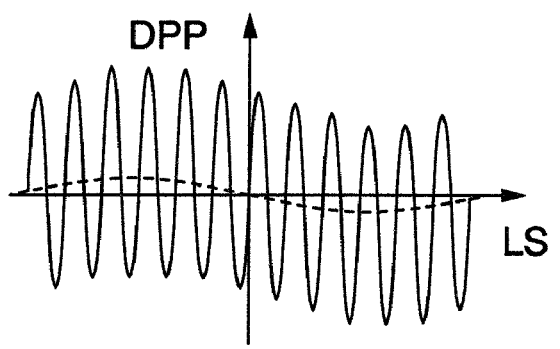

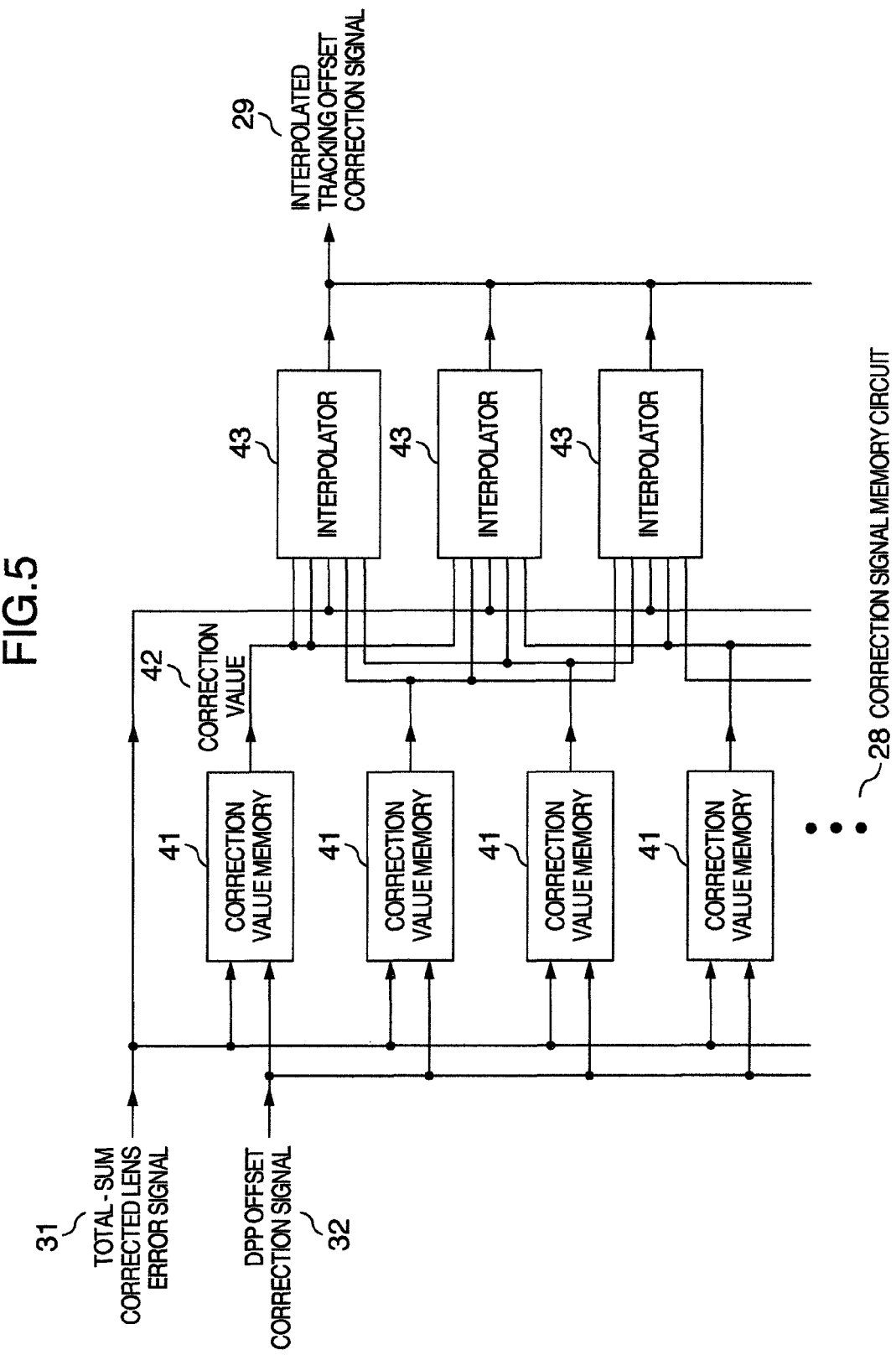

FIG.8
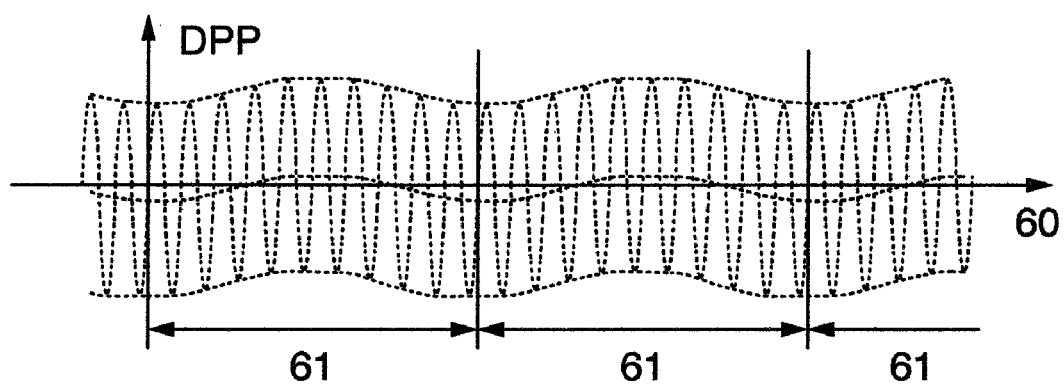
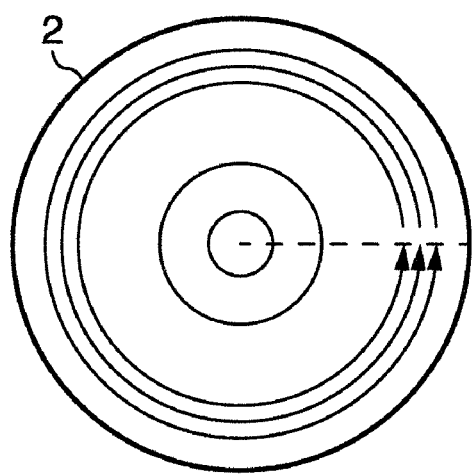

OPTICAL DISK APPARATUS

INCORPORATION BY REFERENCE

The present application claims priority from Japanese application JP2010-060119 filed on Mar. 17, 2010, the content of which is hereby incorporated by reference into this application.

The present application relates to U.S. patent application Ser. No. 12/776,480 filed on May 10, 2010, the entire content of which is incorporated herein by reference.

BACKGROUND OF THE INVENTION

The present invention relates to an optical information writing-reading apparatus, and in particular to an optical disk apparatus. However, the present invention can be applied to general apparatuses using an optical servo function in which tracking control is exercised by using an optical signal.

As a background art, there is a technique disclosed in JP-A-2006-294189. "PROBLEM TO BE SOLVED" is described in JP-A-2006-294189 to be "to provide a tracking control method of an optical disk device capable of correcting off-set of a tracking error signal with high precision even when there are nonlinear characteristics e.g. wherein a shift amount of a position of an objective lens to a mechanically neutral position of the objective lens and an off-set amount of the tracking error signal are not proportional to each other, and to provide the optical disk device." As SOLUTION, there is description "In the tracking control method of the optical disk device performing control by using the tracking error signal, an optical pickup 4 is provided with the objective lens, the shift amount of the position of the objective lens to the mechanically neutral position of the objective lens is estimated and a correction signal of the tracking error signal is generated according to the estimated shift amount of the position of the objective lens by using any one of a plurality of correction functions."

SUMMARY OF THE INVENTION

An important factor for reliability of the optical disk apparatuses is the stability of the tracking servo control. A main factor determining the stability of the tracking servo control is the signal stability that a zero point of the tracking error signals agrees with a center of a writing information track correctly under various use conditions. A deviation from the zero point is called offset of the tracking error signal.

Ideally, the offset of the tracking error signal should be close to zero unlimitedly (no deviation). However, a deviation and an offset are caused by a manufacturing variation of a pickup, which is an optical head, or deviation of a medium such as a warp or undulation. Since the zero point of the signal deviates, it becomes impossible to conduct servo to the track center correctly and it becomes a cause of run off during the writing and reading of the disk.

As a measure for improving solving this problem, a method for correcting the offset which is the deviation quantity in signal processing is disclosed in, for example, JP 2006-294189 described above. However, there is a problem that a sufficient correction effect cannot be obtained due to an influence of vibration characteristics of the objective lens actuator itself and the cost of the corrector becomes high.

The present invention has been made in order to solve the problem. An object of the present invention is to provide an optical disk apparatus in which the offset of the tracking error signal is corrected by signal processing at low cost certainly.

As an example, the object can be accomplished by invention described in claims.

In the optical disk apparatus according to the present invention, double correction effects are obtained fast by a combination of correction among pickup output signals and circuit side correction. Therefore, low-precision low-cost corrector can be used for the circuit side correction, and good frequency characteristics are obtained.

Other objects, features and advantages of the invention will become apparent from the following description of the embodiments of the invention taken in conjunction with the accompanying drawings.

BRIEF DESCRIPTION OF THE DRAWINGS

FIGS. 2A and 2B are diagrams showing a signal processing method in a conventional differential push-pull method;

FIGS. 4A, 4B and 4C are diagrams showing problems of signal processing in an optical disk apparatus using a one-beam method;

FIG. 5 is a diagram showing a detailed configuration example of a correction signal memory circuit;

FIG. 8 is a diagram for explaining a learning example of a disk rotation variation;

DESCRIPTION OF THE EMBODIMENTS

Hereafter, an optical disk apparatus according to the present invention will be described. One of features of the optical disk apparatus according to the present invention is that the offset of the tracking error signal can be corrected simply and certainly on the circuit side according to learning information on the LSI side which is as little as several tens bytes by making the most of characteristics of the pickup output signal. The optical disk apparatus according to the present invention can be implemented by a combination of an optical pickup having a signal output corresponding to the correction and a signal processor having a correction processing function. Furthermore, a higher function and a higher reliability can be implemented with lower cost by incorporating the signal processor into a single integrated circuit chip having an error correction function.

Hereafter, embodiments of the present invention will be described with reference to FIGS. 1 to 11. For facilitating comprehension, components which exhibit the same action are partially denoted by the same reference numbers throughout the drawings.

The optical disk apparatus according to the present embodiment makes it possible to conduct tracking servo correctly by correcting the offset of the tracking error signal.

Figure 3A:
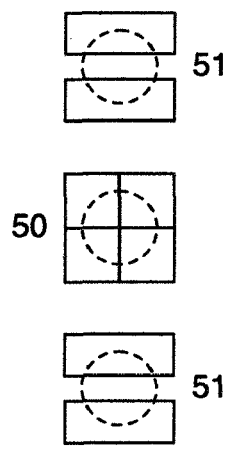
FIGS. 3A and 3B are diagrams showing problems of signal processing in an optical disk apparatus provided to cope with multi-layered disks.
Figure 3B:
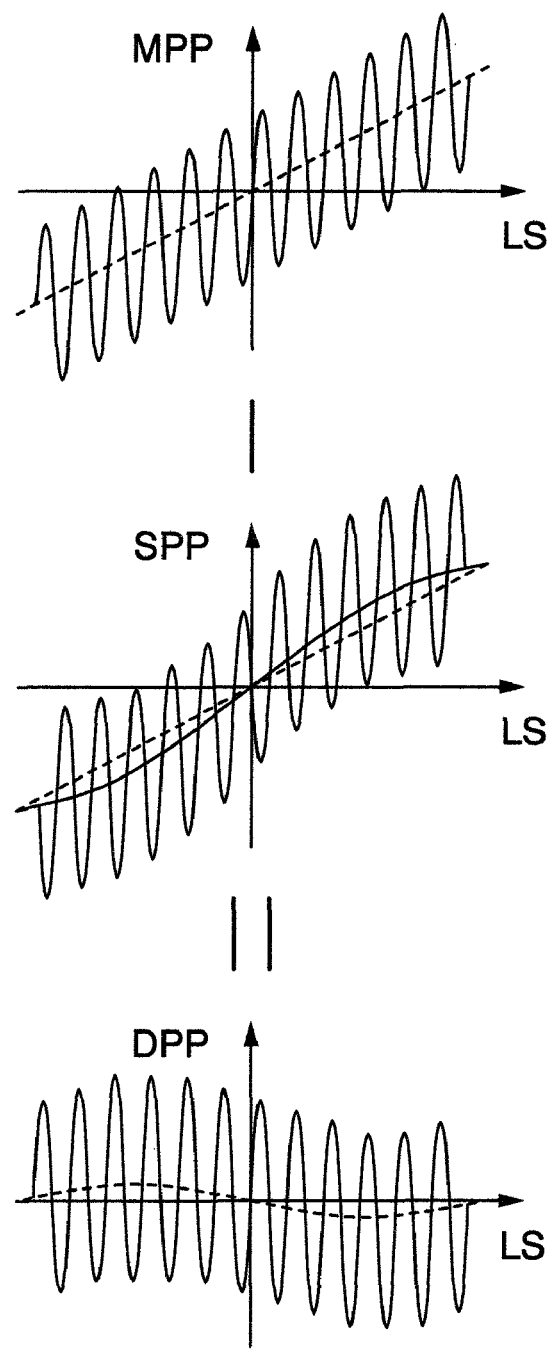

First, problems in the optical disk apparatus will now be described with reference to FIGS. 2A and 2B. In order to trace the track correctly even if there is disk eccentricity, signal correction for correcting the tracking error signal used for the servo with respect to a lens center deviation (lens shift: LS) caused by the eccentricity is conducted in the (conventional) optical disk apparatus. For example, in the case of a three-spot method, the so-called differential push-pull (DPP) method is used. According to the differential push-pull (DPP) method, two sub-spot photodetector planes 51 are disposed on both sides of a main spot photodetector plane 50 as shown in FIG. 2A, and an offset in a push-pull signal (main push-pull signal: MPP) detected in the main-spot photodetector plane is canceled and corrected by obtaining a difference between the push-pull signal (main push-pull signal: MPP) and a push-pull signal (sub push-pull signal: SPP) detected in sub spot photodetector planes. This corrected push-pull signal is called differential push-pull signal (DPP). Generally, the vertical variation (offset) in the DPP signal caused by the lens shift disappears in the differential push-pull signal adjusted correctly, as shown in FIG. 2B. In a multi-layer optical disk having writing layers of at least two or three layers in recent years, however, it has become necessary to use photodetectors in which the central part of the sub spot area is removed as shown in FIG. 3A in order to take a countermeasure to the stray light. In this case, the main spot differs from the sub spots in the photodetector shape. If the spots vary due to a lens shift, therefore, an imbalance occurs between the MPP signal and the SPP signal. Especially in the SPP signal, a non-linear vertical variation (offset) is caused by the lens shift. As a result, a non-linear offset to the lens shift occurs in a signal obtained by using the conventional DPP method, and tracking servo becomes apt to run off in some cases.

A similar problem also occurs in a tracking error signal generation method called one-beam method. Each of FIG. 4A and FIG. 4B shows an example of a diffraction grating pattern used in the one-beam method. Shaded parts in FIG. 4A represent a pattern corresponding to generation of the MPP signal. Shaded parts in FIG. 4B represent a pattern corresponding to generation of the lens error signal (LE signal) which corresponds to the amount of lens displacement or to the SPP signal. Because of the difference of the pattern shapes, a non-linear offset of the DPP signal as shown in FIG. 4C occurs for a large lens shift. Hereafter, this non-linearly caused offset is referred to as nonlinear offset. On the other hand, a straight-line change of the offset is referred to as linear offset.

In general, the linear offset can be canceled to nearly zero, if adjustment is conducted properly by using the DPP method. However, the nonlinear offset cannot be corrected completely, and a nonlinear component remains. The optical disk apparatus according to the present embodiment can correct the nonlinear offset component.

Figure 1:
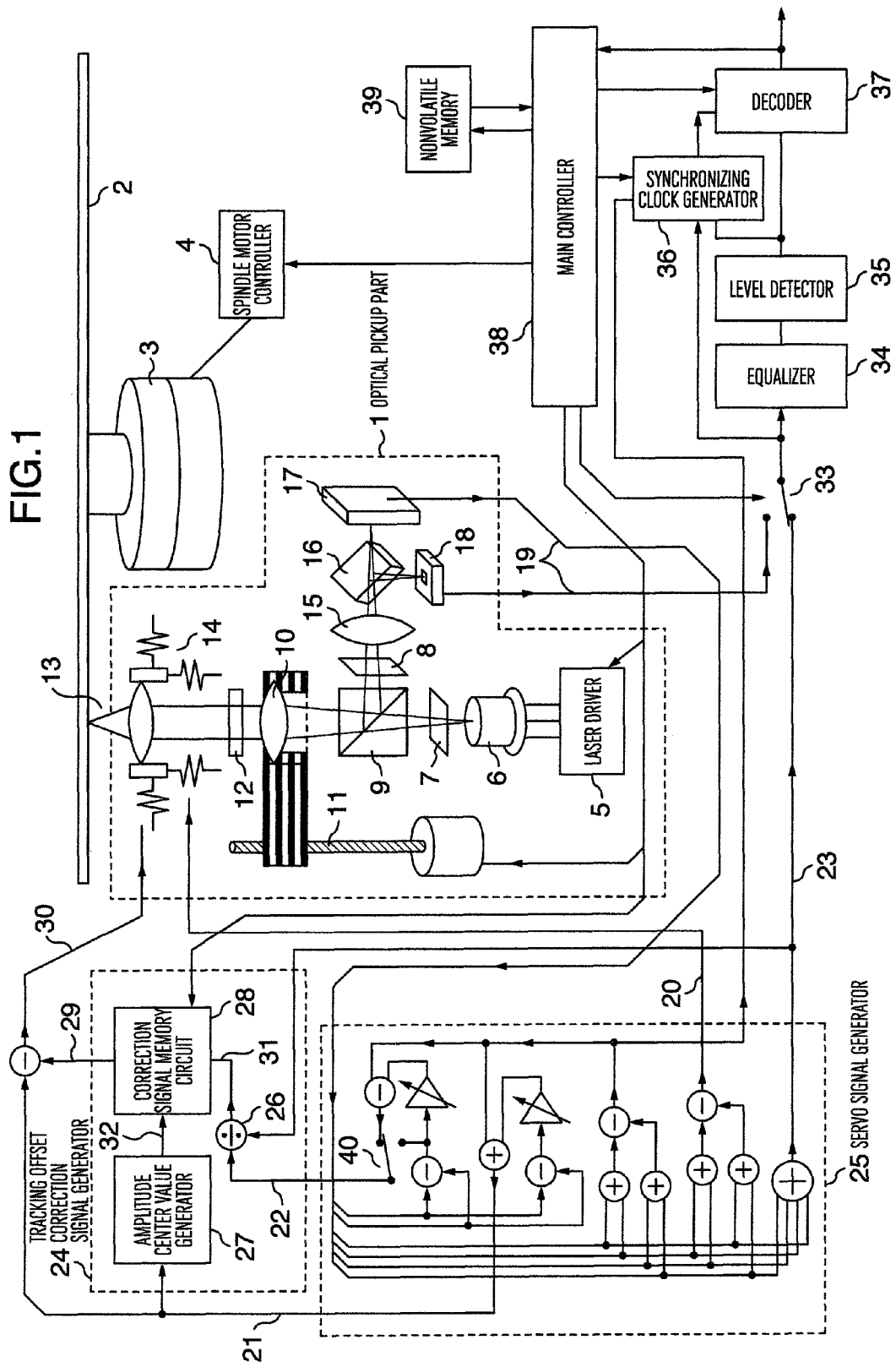
FIG. 1 is a diagram showing an example of an optical disk apparatus according to the present invention.

An embodiment of a general configuration of an information reading apparatus according to the present invention will now be described with reference to FIG. 1.

As for the general configuration, the information reading apparatus includes an optical pickup part 1, a mechanism part including an optical disk 2, which is a medium, and a spindle motor 3, and a remaining signal processor part.

The optical disk 2, which is a recording medium, is mounted on the spindle motor 3 which rotation velocity is controlled by a spindle motor controller 4. The medium is irradiated with light from a semiconductor laser 6 which is driven by a laser driver 5.

The light from the semiconductor laser 6 is passed through a diffraction grating 7 for the three-spot method, and divided into three beams. In the case of a one-beam method, this diffraction grating is not provided and instead a diffraction grating 8 is provided on a return path side. Returning back to the case of the three-beam method, the light passed through the diffraction grating 7 passes through a polarization beam splitter 9 and proceeds to a collimator 10. The collimator 10 is held on a movable part in a lens drive mechanism, and is configured to be able to be moved in a direction parallel to an optical axis by a stepping motor 11. The light passed through the collimator 10 is passed through a quarter-wave plate 12, focused by an objective lens 13, and applied onto the optical disk 2, which is the recording medium. The objective lens 13 is attached onto an actuator 14, and its focus position can be driven in a focus direction and a track direction by a signal from a servo signal generator 25. A part of the applied light is reflected by the disk 2, passed through the objective lens 13, passed through the quarter-wave plate 12, passed through the collimator 10, and incident on the polarization beam splitter 9. At this time, polarization of the luminous flux is rotated by 90°, because it has passed through the quarter-wave plate 12 twice. As a result, the luminous flux is reflected by the polarization beam splitter 9. (In the case of the one-beam method, the light is passed through the diffraction grating 8 at this time.) The light proceeds to a detection lens 15. The light passed through the detection lens 15 is passed through a semireflecting mirror 16, detected at a detection surface on a photodetector 17, and converted to an electric signal. In order to improve the signal-to-noise ratio (S/N ratio) of the readout signal, the semireflecting mirror 16 is inserted between the detection lens 15 and the photodetector 17, and a readout signal detector 18 having a high S/N is juxtaposed.

An electric signal obtained by the conversion on the photodetector 17 is amplified by an optical current amplifier in the photodetector, and a light sensing signal 19 is output. The servo signal generator 25 generates a focus error signal 20, a tracking error signal 21, a lens error signal 22, and a readout signal 23 (RF signal) from the light sensing signal 19. In the present example, the focus error is detected by using an astigmatism method with a quadrant photo-detector as the three-beam method. In the case of the one-beam method, the focus error signal is detected by using the knife edge method.

A tracking offset correction signal generator 24 outputs a tracking offset correction signal 29 (ΔDPP correction value) on the basis of the tracking error signal 21 (DPP), the lens error signal 22, (LE) and the readout signal 23 (RF signal), which are output by the servo signal generator 25. A switch 40 conducts switching between the three-beam method and the one-beam method. FIG. 1 shows a state in which the switch 40 has been changed over to the three-beam method side. The tracking offset correction signal generator 24 first generates a total-sum corrected lens error signal 31 (corrected LE) by using a divider 26 on the basis of the lens error signal 22 and the readout signal 23 (RF signal). This is useful to raise the precision of the correction according to the present invention by preventing false detection of the lens shift quantity caused by a variation of the total readout light quantity. An amplitude center value generator 27 generates an upside envelope signal depending upon maximum value peak detection and a downside envelope signal depending upon minimum value peak detection on the basis of a push-pull signal obtained from the tracking error signal 21 at the time of tracking servo off. The amplitude center value generator 27 generates a DPP offset correction signal 32 (ΔDPP learned value) by finding an average value of the upside envelope signal and the downside envelope signal. A correction signal memory circuit 28 stores, reads out and interpolates the DPP offset correction signal 32 (ΔDPP), which is output from the amplitude center value generator 27, in accordance with a signal value of the total-sum corrected lens error signal 31, which is output from the divider 26, and outputs the tracking offset correction signal 29. A DC-offset corrected tracking error signal 30 for driving the actuator 14 is generated by conducting addition/subtraction on the tracking offset correction signal 29 and the tracking error signal 21 for the purpose of correction.

Either the readout signal 23 read out from the disk 2 or an output of the readout signal detector 18 is selected by a switch 33. After being selected, the readout signal 23 is supplied to a decoder 37 via an equalizer 34, a level detector 35 and a synchronizing clock generator 36. In the decoder 37, the readout signal 23 is converted to the written original digital signal. At the same time, the synchronizing clock generator 36 directly detects the synthesized readout signal, generates a synchronizing signal, and supplies the synchronizing signal to the decoder 37. A series of these circuits are controlled generally by a main controller 38. In the present configuration, a nonvolatile memory 39 is included. The nonvolatile memory 39 retains initial parameters of the optical pickup required for the correction even during the time period in which the power supply is in the off state. As a result, initialization operation can be conducted fast by utilizing results learned the last time. The main controller 38 detects the rotation period of the spindle as well, and consequently the learning can be conducted in synchronism with the rotation of the spindle. A higher precision and a faster speed of the correction are reconciled by measuring a push-pull variation of one round every rotation of the spindle and conducting the learning.

A configuration of the correction signal memory circuit 28 will now be described in detail with reference to FIGS. 5 and 6.

FIG. 5 shows a detailed configuration of the correction signal memory circuit 28. The correction signal memory circuit 28 conducts storage and interpolation processing of a DPP offset quantity to be corrected, in accordance with a lens shift quantity (which is a lens error signal value before correction here). Among a plurality of correction value memories 41, one memory corresponding to a range of the value of the total-sum corrected lens error signal 31 functions to store the DPP offset correction signal 32 (ΔDPP learned value), which is input thereto, during learning at the time of focus servo on and tracking servo off. A correction value 42 which is stored is output to interpolators 43. Among interpolators 43, an interpolator which has coincided in the corresponding interpolation range outputs a tracking offset correction signal 29 which has been interpolated, by using the stored correction values 42 at four neighboring points and the total-sum corrected lens error signal 31. As a result, an interpolated waveform output obtained by smoothly coupling points of the stored correction values is generated as an output of the correction signal memory circuit 28.

Figure 6:
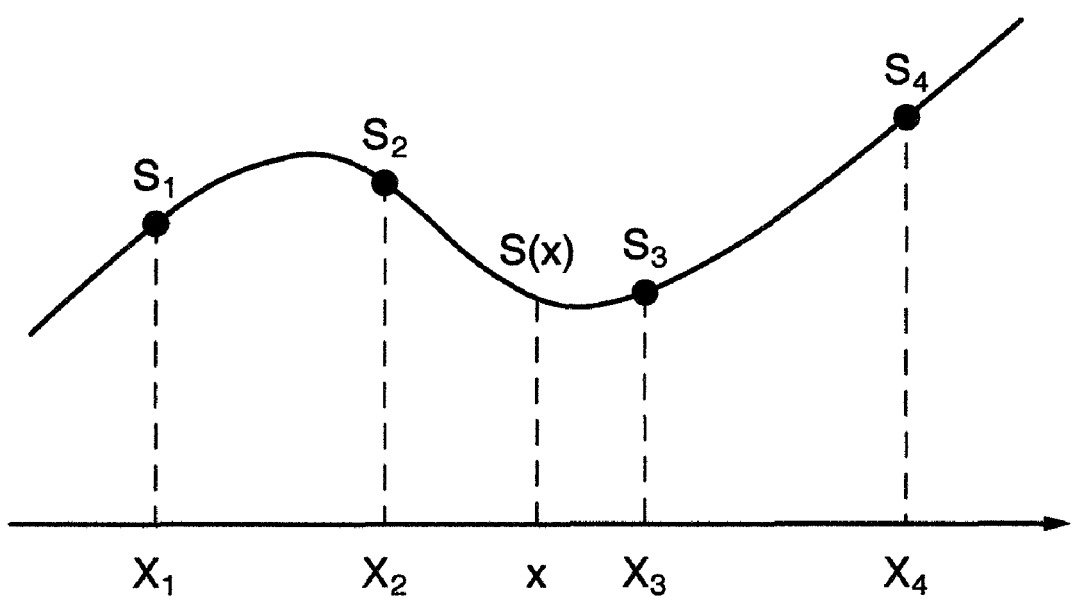
FIG. 6 is a diagram for explaining operation of interpolators.

FIG. 6 shows an internal operation of the interpolators 43. The interpolation processing is conducted by using the spline-method processing. Denoting the total-sum corrected lens error signal 31 by x and the stored correction value 42 by S, calculated values of the spline processing are approximated by a smooth function of the third degree as shown in FIG. 6 and output.

At the time of learning, "a", "b", "c" and "d" are found by using the following equation every section.

$$\begin{pmatrix} a \\ b \\ c \\ d \end{pmatrix} = \begin{pmatrix} X_1^3 & X_1^2 & X_1 & 1 \\ X_2^3 & X_2^2 & X_2 & 1 \\ X_3^3 & X_3^2 & X_3 & 1 \\ X_4^3 & X_4^2 & X_4 & 1 \end{pmatrix}^{-1} \begin{pmatrix} S_1 \\ S_2 \\ S_3 \\ S_4 \end{pmatrix} \quad \text{Expression 1}$$

Correction values are calculated and output by using the following equation while the tracking servo is on.

$$S(x) = ax^3 + bx^2 + cx + d \quad \text{Expression 2}$$

Timing at which learning is conducted is limited to time when a push-pull signal amplitude can be obtained. Therefore, the timing is limited to a time period over which the focus servo is on and the tracking servo is off. Since it is necessary to store values associated with respective lens shift quantities (total-sum corrected lens error signals 31), the lens shift scan operation is conducted while the above-described servo conditions are satisfied. At the time of shipping of the optical disk apparatus, it is also possible to conduct the present learning beforehand. The learning can be conducted in the radial direction as well. High precision correction which copes with deviation of the medium better can be conducted by conducting the scan in the radial direction.

Figure 11:
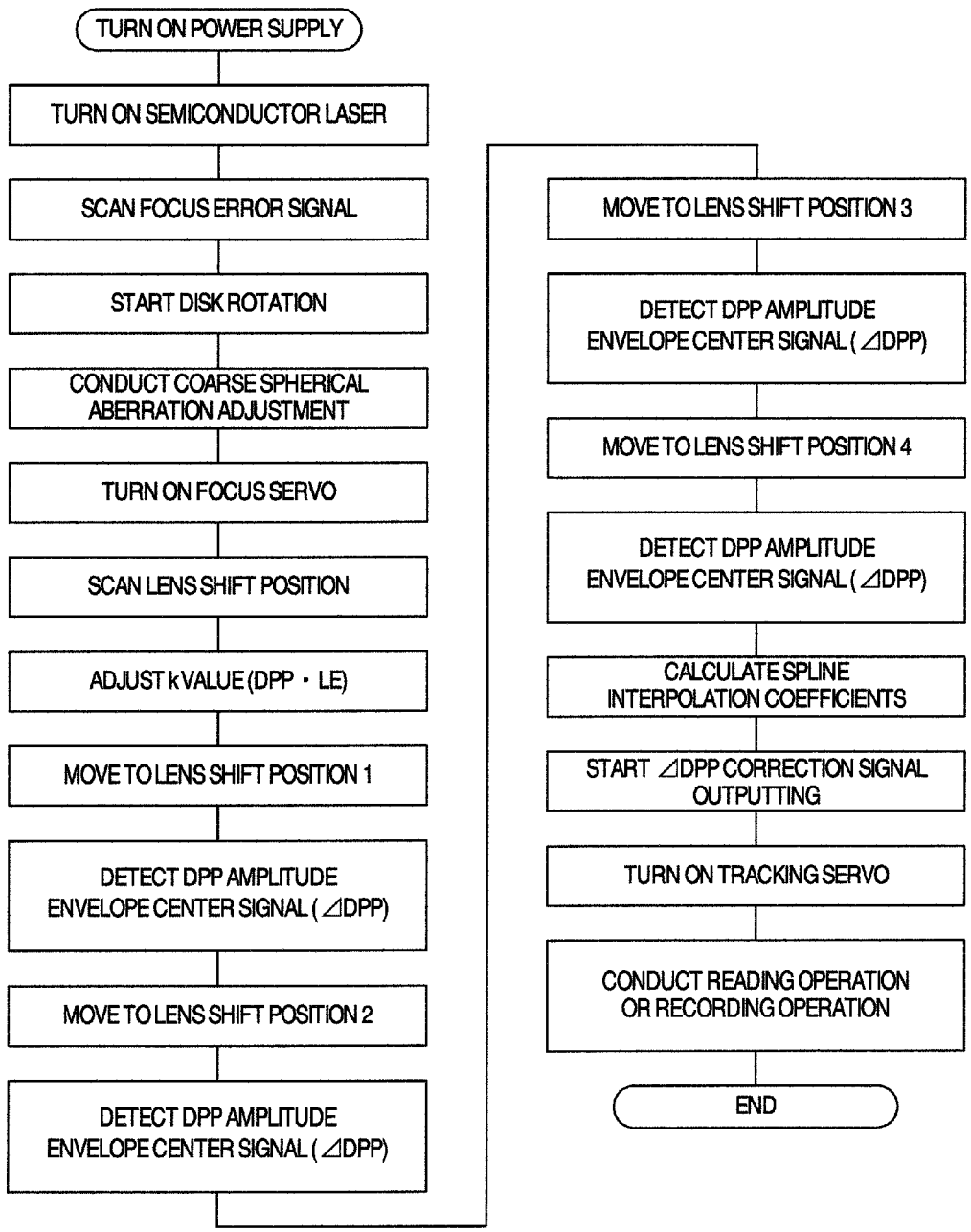
FIG. 11 is a diagram for explaining an example of a learning procedure.

FIG. 11 shows an example of a procedure of its correction learning. A semiconductor laser is lit, and scanning the focus error signal caused by a vertical movement of the lens (lens swing) is conducted to discriminate the kind of the disk. Then, rotation of the disk is started, and the position of the collimator is moved to conduct coarse adjustment of spherical aberration. Then, the focus servo is turned on. Since the DPP signal can be detected at this time point, the lens shift is conducted, gains of variable gain amplifiers located at two places are adjusted, and a k-value adjustment in the so-called differential push-pull method is conducted. Since as a result the linear offset in the DPP signal is corrected, learning is conducted by storing the remaining nonlinear offset into the correction value memory generator. The lens shift position is changed to several points at this time, and a ΔDPP learning value corresponding to each point is learned. Typically, a DPP amplitude envelope center signal during one rotation of the disk is detected in each lens shift position and stored. Spline interpolation coefficients are calculated by learning a plurality of the stored DPP amplitude envelope center signals. After the learning is completed, outputting the tracking offset correction signal (ΔDPP) is started, and the tracking servo is turned on to enter a reading operation or a writing operation.

Figure 7:
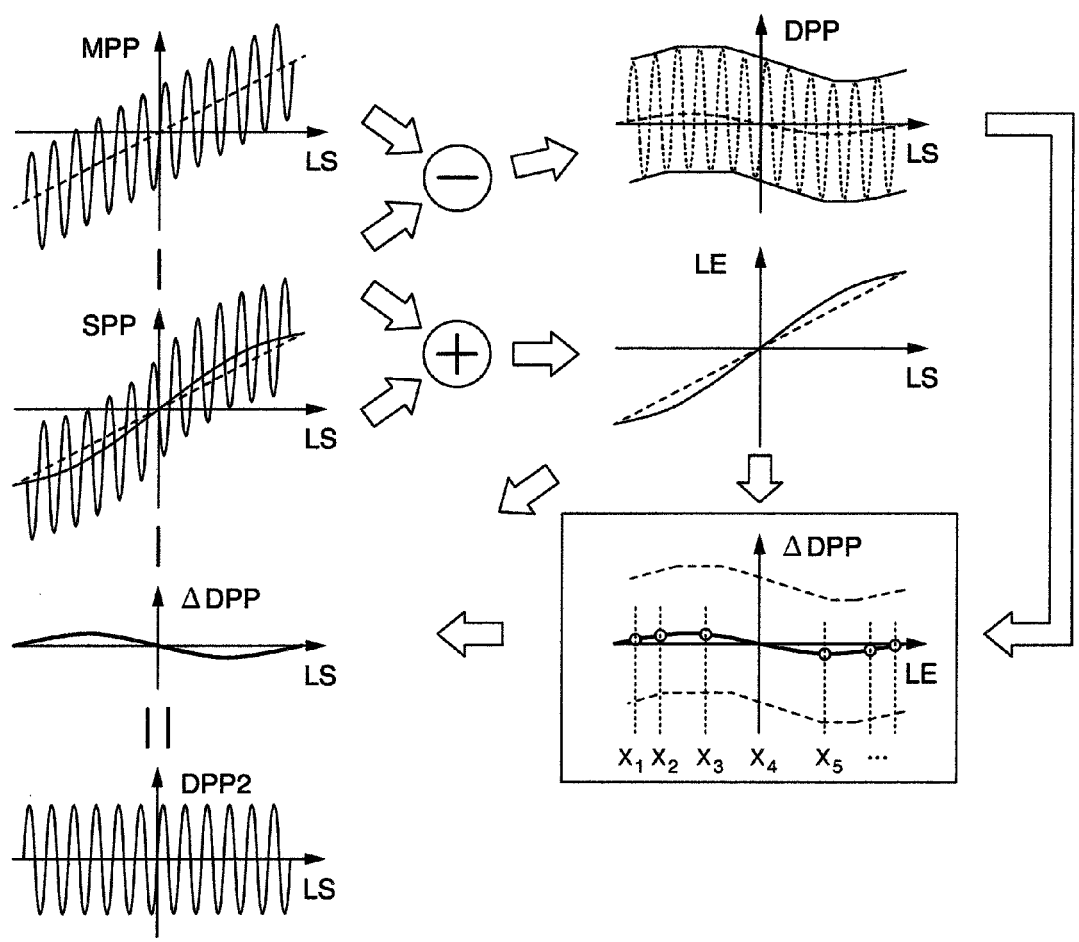
FIG. 7 is a schematic diagram for explaining a principle for correcting an offset of a tracking error signal in an embodiment.

The present configuration and its correction principle heretofore described are summed up as shown in FIG. 7. In the ordinary DPP method, the DPP signal and the LE signal are generated from the MPP signal and the SPP signal. In the present configuration, however, a nonlinear offset remaining in the DPP signal is learned and stored by using the LE signal as input during the tracking servo off, and then the tracking servo is turned on. While the writing operation or the reading operation continues, the correction value (ΔDPP) of nonlinear offset of the DPP signal is generated simultaneously with the spline interpolation on the basis of the LE signal (distorted lens shift signal) obtained in real time. In this way, the vertical variation of the DPP signal is corrected. As a result of the correction, a DC-offset corrected tracking error signal (DPP2) is generated. An accurate value of the lens shift quantity (LS) is unknown in the present circuit, and a lens error signal (LE) containing distortion is used instead of the lens shift quantity to generate a correction signal. The differential push-pull signal (DPP signal) is in that case considered as an ordinary tracking error signal. In some cases, however, a signal obtained by subtracting a lens shift signal corresponding to a lens shift from an MPP signal in the one-beam method is called DPP signal for convenience' sake. Serving for both the three-beam method and the one-beam method, a signal which can be used as the tracking error signal is herein referred to as DPP signal.

In other words, in the present configuration, correction corresponding to a feature of the pickup such as lens shift depending curve characteristics of the tracking error signal is possible. In particular, correction of nonlinearity can be conducted at low cost and with high precision. If feedback control is engaged to make the error signal itself zero as in the conventional art, it becomes impossible to conduct estimation while the tracking servo is on. On the other hand, in the present configuration, since the LE signal corresponding to the shift quantity is detected even while the tracking servo is on, accurate calculation of the correction value is possible. Furthermore, since the lens error signal is first generated and the correction signal is generated on the basis of the lens error signal, the correction signal can be generated by conducting only addition and subtraction on signals and an attenuator is not needed, resulting in a low cost. Furthermore, even if the LE signal value is distorted with respect to the actual lens shift quantity (LS), the DPP offset correction signal (ΔDPP) can be generated correctly regardless of the distortion of the LE signal by referring to the same LE signal at the time of correction and accurate correction can be implemented. Furthermore, since the mechanically neutral position precision of the objective lens is unnecessary, the learning result is not disturbed by the influence of vibration in the neighborhood. Accurate learning and correction are possible even under vibration such as on an automobile. Furthermore, since only a nonlinear offset component of the tracking error signal is corrected, the correction precision of the tracking error signal is improved. The number of bits stored as a value for correction and the number of bits for A/D conversion can be reduced. Computation precision of linear interpolation for correction can also be reduced. Computation time (sampling rate) of the value for correction and the correction output response frequency can also be reduced, and the cost can be reduced. Furthermore, since the learning precision of the correction value can be done with less, the time period required for leaning can be shortened and preparation operation becomes fast.

Furthermore, in the nonlinear offset correction method of the DPP signal according to the present configuration, the correction function using the DPP offset correction signal (ΔDPP) can be used as an additional correction function for the ordinary linear offset correction. In other words, only when the amplitude center signal generator 27 has detected that the DPP signal generated by the ordinary linear offset correction contains a large amount of nonlinear offset component, learning operation for generating the ΔDPP signal can be conducted. As a result, at the ordinary time when the nonlinear offset in the DPP signal does not pose a problem, the optical disk apparatus can be started faster by skipping the learning operation for correcting the nonlinearity. If the learning operation is skipped, then the DPP offset correction signal should be set equal to zero (ΔDPP=0).

Furthermore, in the present configuration, correction which copes with dispersion of an individual pickup as well can be conducted by the learning at low cost.

It is possible to grasp the variation in the round with high reproducibility even on a disk having nonuniformity depending upon the rotation direction and conduct stable correction value learning by conducting learning in synchronism with the disk rotation as shown in FIG. 8. Specifically, even if the DPP signal can be adjusted in k-value correctly, the DPP signal varies vertically with respect to time 60 during one rotation period 61 due to the influence of the warp of the disk in some cases. Therefore, correction value learning can be stabilized by learning these variations which are not caused by factors other than the lens shift characteristics of the pickup in synchronism with the disk rotation.

Or it is possible to grasp the variation over the whole round of the disk fastest and conduct stable correction value learning by conducting learning at one point every rotation of the spindle. In this case as well, correction value learning can be stabilized by obtaining a time average during one rotation.

Figure 9:
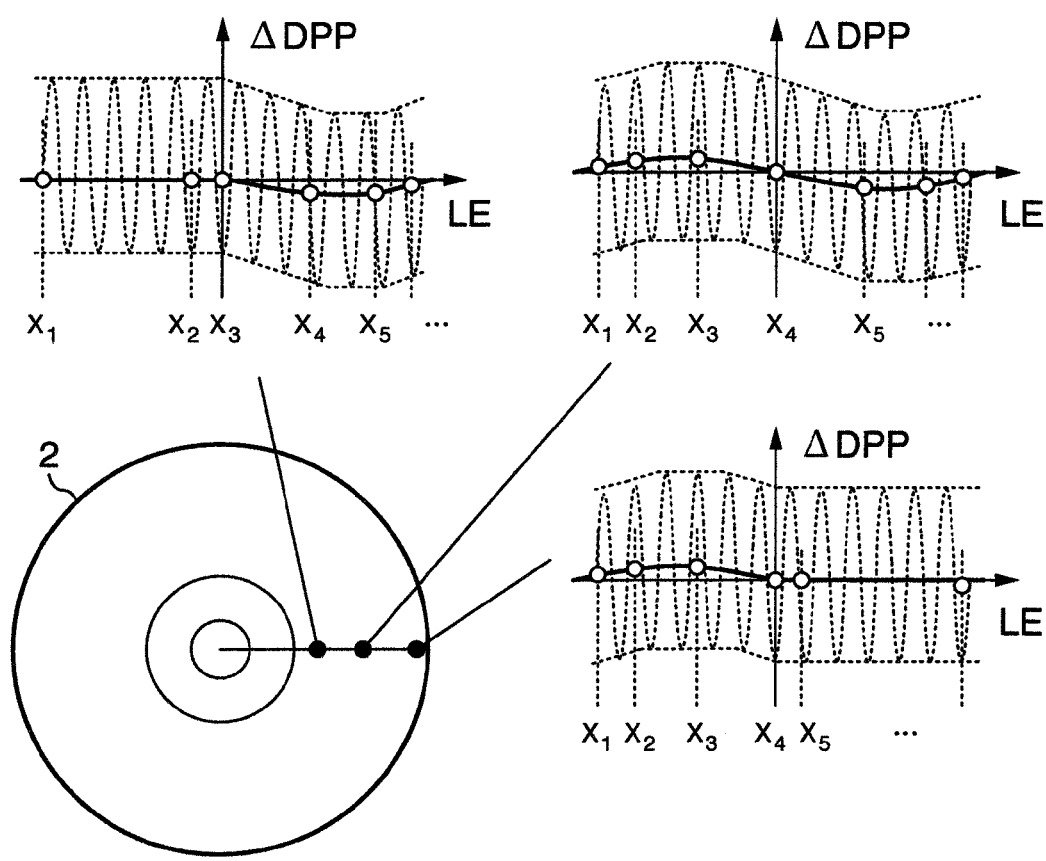
FIG. 9 is a diagram for explaining a learning example in different radial positions.

In the present configuration, it is possible to conduct correction value learning in which stable control coping with individual dispersion of the disk is possible, by conducting correction value learning which copes with dispersion (warp, undulation and film thickness change) of the disk corresponding to a position in the radial direction of the disk as shown in FIG. 9. In this case, the correction value learning sequence is repeated in respective radial positions of the disk. Initialization operation is made fast by conducting the correction value learning only when the tracking signal is detected to be unstable on the disk and skipping the learning on the ordinary disk.

Since learning is conducted by using the spline interpolation in the present configuration, high precision optimum correction values can be predicted with the number of lens shift positions for learning reduced to the minimum. Accordingly, the time period required for the learning can be held down to the minimum, and the preliminary operation of the optical disk can be made fast. It is possible to prevent an abnormal correction value due to noise by previously conducting fitting processing on the correction values and conducting averaging, and the precision of the control can be made high. Furthermore, since the nonvolatile memory 39 capable of storing the learning result is provided and the processing after the tracking servo turns on can be previously finished, the servo processing can be conducted fast.

In the present configuration, correction based on total readout light quantity is conducted on the lens error signal. Therefore, a signal depending upon an accurate lens shift position can be obtained from the correction by a combination of the correction based on the total readout light quantity and the corrector of the lens shift signal itself, regardless of a difference between written areas and unwritten areas on the disk and a difference of the operation condition such as writing and reading. Therefore, an accurate tracking offset correction signal having high reproducibility is obtained, and the precision of the correction can be made high.

The present configuration can be used in the one-beam scheme as well. In the one-beam scheme, the visual field (deviation between an outward trip and a return trip of a luminous flux in effective beam radius) changes with the lens shift in principle. Usually as compared with other schemes such as the three-beam scheme, therefore, the nonlinearity of the lens shift signal change caused by the lens shift is large and the good improvement effect of the nonlinear component correction is obtained.

The present configuration can also be used in the three-beam scheme having a detector plane in which the center part of the sub spot is removed. Usually in the three-beam scheme, the linearity of the lens shift signal change with respect to the lens shift is comparatively fine and consequently the nonlinearity is small. In the case of the modified three-beam scheme in which the center part of the sub-spot detector plane is removed to take a measure to counter two-layer interference light, however, the sub spot differs in detector plane shape from the main spot. Usually, as compared with other schemes such as the three-beam scheme, therefore, the nonlinearity of the lens shift signal change caused by the lens shift is large and the good improvement effect of the nonlinear component correction is obtained.

Figure 10:
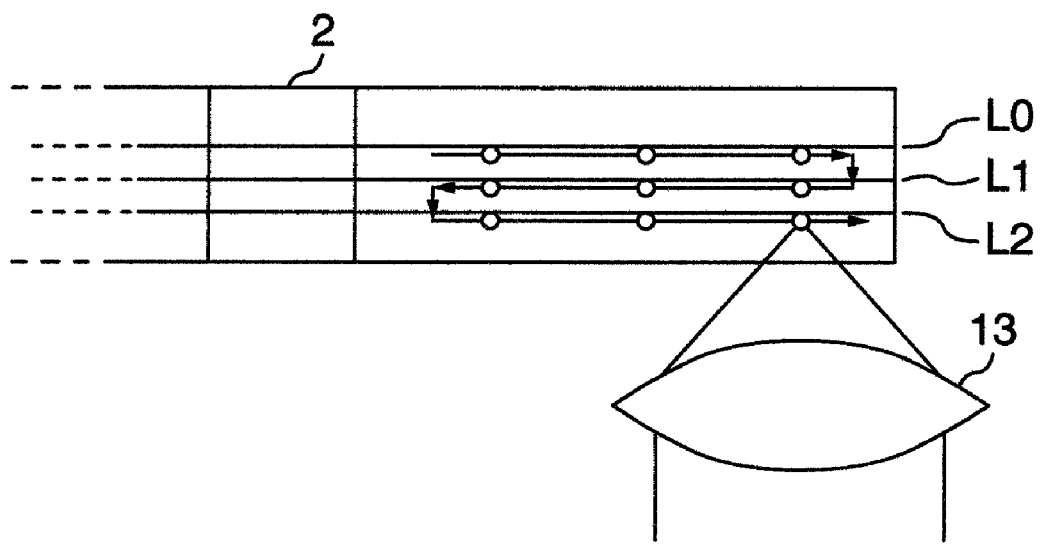
FIG. 10 is a diagram for explaining a learning example in a multilayer optical disk.

The present configuration can bring about great effects to multi-layer optical disks shown in FIG. 10 as well. Especially in the multi-layer optical disks having at least three layers, a large amount of stray light is incident on the photodetector because of reflected light between layers. Influence of the stray light generates a symptom that the nonlinearity and strain of the tracking offset obtained in each layer at the time of lens shift differs from layer to layer. Even when the multi-layer optical disk medium is used, it is possible to make the most of the effects of the present correction and obtain fine tracking servo stability by conducting corrections in respective layers. In this case, the nonlinear offset of the tracking error signal caused by the stray light peculiar to the multi-layer optical disk medium can be corrected by conducting, for example, learning of the ΔDPP value in respective radial positions of the disk every layer.

The present invention can also be applied to, for example, other optical writing apparatuses in which tracking detection is conducted by utilizing interference.

The present invention is not restricted to the above-described embodiments, but various modifications are included. For example, the embodiments have been described in detail in order to describe the present invention intelligibly. The present invention is not necessarily restricted to embodiments including all described configurations. A part of the configuration of an embodiment can also be replaced by a configuration of another embodiment. It is also possible to add a configuration of an embodiment to a configuration of another embodiment. On a part of a configuration of each embodiment, it is possible to conduct addition, deletion and substitution of another configuration.

A part or the whole of each of the configurations may be formed of hardware, or may be formed to be implemented by executing a program in a processor. As for control lines and information lines, those considered to be necessary in description are shown, and all control lines and information lines are not necessarily shown in the product. As a matter of fact, it may be considered that almost all configurations are connected to each other.

The invention claimed is:

1. An optical disk apparatus comprising an optical pickup and a signal processor,
the optical pickup comprising:
an actuator for driving an objective lens; and
a detected light intensity signal output part for outputting a detected light intensity signal to the processor,
the signal processor comprising:
a servo signal generator for generating a tracking error signal and a lens error signal by conducting addition/subtraction on the detected light intensity signal supplied from the detected light intensity signal output part; and
a tracking offset correction signal generator which is input with the lens error signal to output a tracking offset correction signal,
wherein DC (direct current) offset correction is conducted by conducting addition/subtraction between the tracking error signal and both the lens error signal and the tracking offset correction signal.

2. The optical disk apparatus according to claim 1,
wherein the tracking error signal and the lens error signal are generated by using a one-beam scheme.

3. An optical disk apparatus comprising an optical pickup and a signal processor,
the optical pickup comprising:
an actuator for driving an objective lens; and
a detected light intensity signal output part for outputting a detected light intensity signal to the processor,
the signal processor comprising:
a servo signal generator for generating a main push-pull signal and a sub push-pull signal on the basis of the detected light intensity signal supplied from the detected light intensity signal output part;
a signal generator for generating a differential push-pull signal and a lens error signal by conducting addition/subtraction on the main push-pull signal and the sub push-pull signal; and
a tracking offset correction signal generator which is input with the lens error signal to output a tracking offset correction signal,
wherein the differential push-pull signal correction is conducted by conducting addition/subtraction between the differential push-pull signal and the tracking offset correction signal.

4. The optical disk apparatus according to claim 3,
wherein the tracking offset correction signal generator comprises storage means for storing a plurality of tracking offset correction values respectively associated with a plurality of lens shift positions, and
the plurality of tracking offset correction values respectively associated with the plurality of lens shift positions are stored in the storage means by learning operation before start of reading operation or before start of writing operation.

5. The optical disk apparatus according to claim 4,
wherein the learning operation is conducted in a state of tracking servo off when focus servo is on, and
the learning operation is conducted by scanning the plurality of lens shift positions in synchronism with rotation of a spindle for rotating a disk, detecting an amplitude envelope of the detected tracking error signal, and storing tracking offset correction values.

6. The optical disk apparatus according to claim 5,
wherein the learning operation is executed a plurality of times in different disk radial positions.

7. The optical disk apparatus according to claim 4,
wherein the learning operation is conducted in a state of tracking servo off when focus servo is on, and
the learning operation is conducted by scanning the plurality of lens shift positions at a rate of one point per rotation of the spindle, detecting an amplitude envelope of the detected tracking error signal, and storing tracking offset correction values.

8. The optical disk apparatus according to claim 4,
wherein the tracking offset correction signal generator conducts spline interpolation on correction values in the plurality of lens shift positions for which the tracking offset correction values are stored, and generates the tracking offset correction signal.

9. The optical disk apparatus according to claim 4,
wherein an optical disk medium corresponding to the optical disk apparatus is a multi-layer optical disk medium having at least three writing planes, and
scanning is executed and correction learning is conducted in respective layers in the learning operation.

10. The optical disk apparatus according to claim 3,
comprising a lens error signal corrector for correcting the lens error signal on the basis of sum total of detected light intensity signal outputs.

11. The optical disk apparatus according to claim 3,
wherein the tracking error signal and the lens error signal are generated by using a three-beam scheme in which a center part is removed in sub-spot detector planes.

* * * * *